(No Model.)
H. P. TOBIN & M. HOLMAN.
COTTON CHOPPER.
No. 463,012. Patented Nov. 10, 1891.
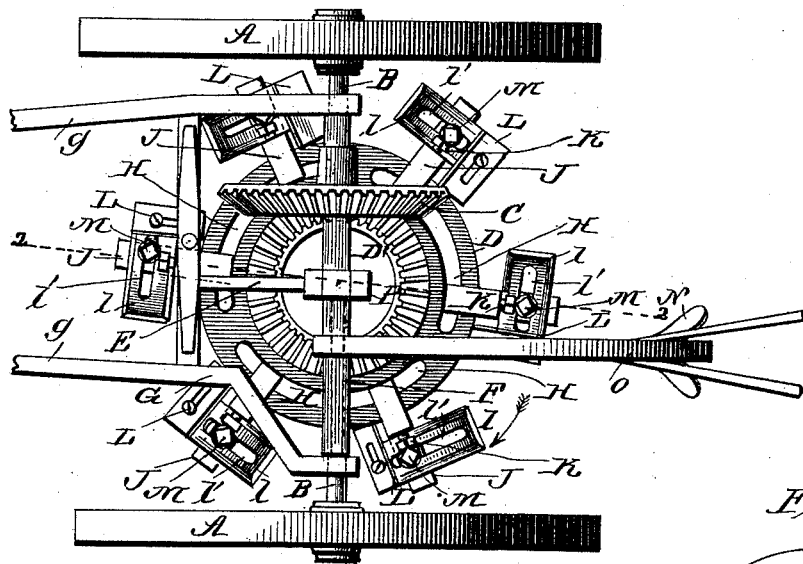
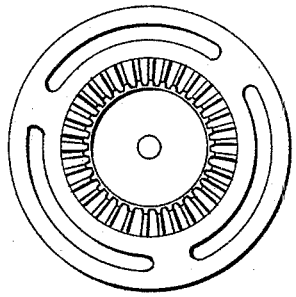
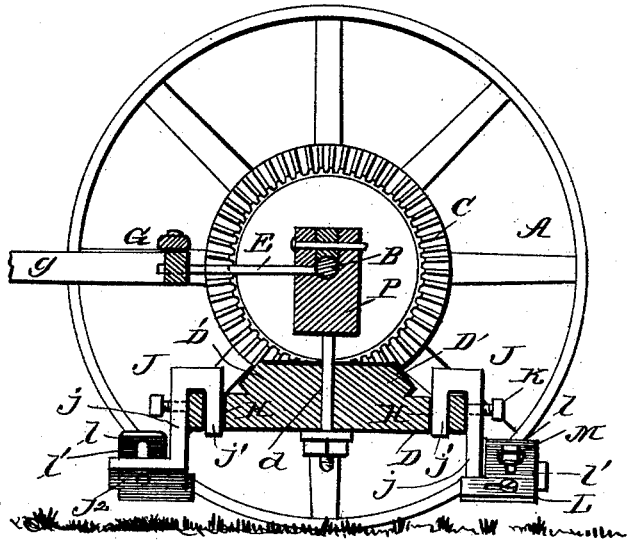
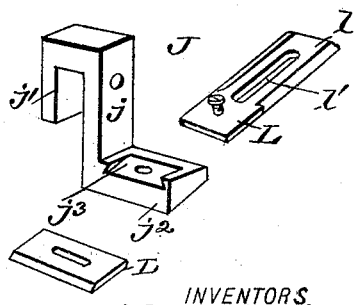
WITNESSES:
Fred G. Dieterich
Jos. A. Ryan
INVENTORS
H. P. Tobin.
March Holman
BY
ATTORNEYS

UNITED STATES PATENT OFFICE.

HENRY P. TOBIN AND MARCH HOLMAN, OF ALLENDALE, SOUTH CAROLINA.

COTTON-CHOPPER.

SPECIFICATION forming part of Letters Patent No. 463,012, dated November 10, 1891.

Application filed August 13, 1891. Serial No. 402,584. (No model.)

*To all whom it may concern:*

Be it known that we, HENRY P. TOBIN and MARCH HOLMAN, residing at Allendale, in the county of Barnwell and State of South Carolina, have invented certain new and useful Improvements in Cotton-Choppers, of which the following is a specification.

Our invention has for its object to provide a simple, cheap, and effective cotton-chopper; and it consists in the novel arrangement and peculiar combination of parts hereinafter specified and claimed, reference being had to the accompanying drawings, in which—

Figure 1 is a top plan view of our improved cotton-chopper. Fig. 2 is a vertical longitudinal section on line 2 2, Fig. 1. Fig. 3 is a detail view of the rotatable cutter-carrying disk, and Fig. 4 is a similar view of one of the cutters and its support.

The carrier-wheels A A are mounted on the axle B, which in practice is formed with the usual clutch mechanism, (not shown,) whereby the axle is made fast with the wheels to turn therewith when traveling in a forward direction.

C indicates a gear-wheel fixedly held on the shaft B, which meshes with a gear-wheel $D'$, formed on a horizontally-disposed disk D, held to rotate on a spindle $d$, formed on the lower end of a depending beam or frame P, loosely supported from the axle B and braced by the rods E and F, which connect said beams with the shaft-frame G, said frame G having its members $g$ $g$ loosely supported on the axle, as shown.

The disk D is formed with a series of segmental slots H, in which are adjustably fitted the cutter-carriers J or supports, one of which is most clearly shown in Fig. 4 of the drawings, by reference to which it will be seen that such carriers each consist of a vertical bar $j$, formed with a hook-shaped member $j'$, which fits down into any one of the slots H and is adjustably held therein by the holding-screw K. The bar $j$ is also formed with an outwardly-projecting member $j^2$, which forms the seat for the cutter-shank $l$, which fits an inclined recess $j^3$ in said member $j^2$, being held therein by the adjusting-screw M, which passes through an elongated slot $l'$ in the cutter-shank, as shown.

By referring to Fig. 1 of the drawings it will be observed that the cutter-carrier members $j^2$ project radially from the disk D and the cutters L are held circumferentially to the said disk, but diagonally to the vertical axis thereof, such construction providing for a positive and effective operation of the cutting-blades L on the young plants, and by arranging the said cutters adjustable in their supports also provides for the easy setting of the cutters as the height of the young plants may require.

In operation, when the machine travels forward, the disk is rotated in the direction indicated by the arrow in Fig. 1, which causes the blades to revolve continuously as the machine advances, thereby thinning out the plants, one or more covering-plows N, secured to rearwardly-extending beams O, being provided for turning up the soil.

Our invention is exceedingly simple, and its advantages are readily apparent from the foregoing description, taken in connection with the drawings.

Having thus described our invention, what we claim, and desire to secure by Letters Patent, is—

1. In a cotton-chopper, the combination, with the drive-axle B and the gear-wheel C held to turn therewith, of the horizontally-arranged rotatable disk D, supported from the axle and geared with the gear-wheel C, said disk provided with radial cutter-carriers J, and the cutters L, supported on said carriers and arranged diagonally to the axis of the said disk, substantially as shown and described.

2. The combination of the wheels A, shaft B, gear-wheel C, the hanging frame P, the disk D, held to rotate on the lower end thereof, said disk formed with a gear $D'$, meshing with the wheel C, and provided with a series of segmental slots H, the radial-projected cutter-carriers J, adjustably held in said slots H, and the cutters L, adjustably held on said carriers J, all arranged substantially as and for the purpose described.

3. In a cotton-chopper, the combination, with drive-axle B and the rotatable disk D, geared with and operated by the said axle B, of the cutter-carriers J, formed each of a vertical member $j$, having a hooked member $j'$, adapted to be adjustably held on said disk, and a radial member $j^2$, formed with an inclined seat $j^3$, and the cutters L, each formed with a slotted shank $l$, arranged to fit the seat $j^3$ and adjustably held therein, all arranged substantially as shown, and for the purpose described.

4. An improved cotton-chopper consisting of the supporting-wheels A and shaft B, a depending frame P, loosely supported from the drive-axle, a rotatable cutter-carrying disk D, gear connections between said disk and shaft, said disk formed with segmental slots H, the cutter-carriers J, adjustably held in said slots and projected radially from the disk, the cutters L, arranged circumferentially to the disk and adjustably held in said carriers diagonally to the vertical axis of the disk, and the covering-plow N, all arranged substantially as and for the purposes described.

HENRY P. TOBIN.
MARCH HOLMAN.

Witnesses:
J. S. MIXSON,
B. C. PICKMAN.